No. 854,842. PATENTED MAY 28, 1907.
J. RAMSPERGER.
ARTIFICIAL TOOTH.
APPLICATION FILED NOV. 8, 1906.
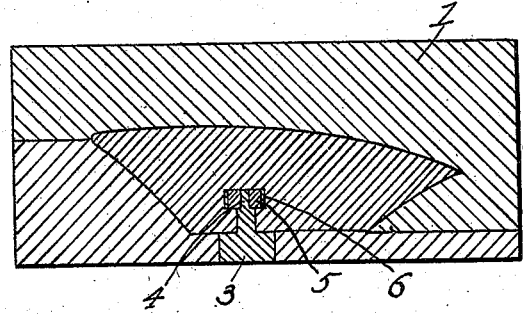
Fig. 1.
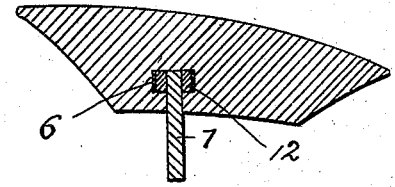
Fig. 4.
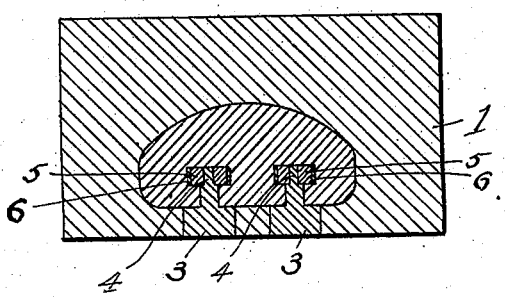
Fig. 2.
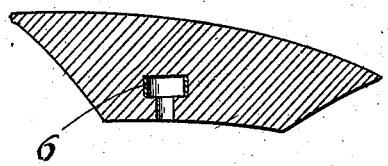
Fig. 3.
Inventor
Joseph Ramsperger.
Witnesses
By
Attorneys
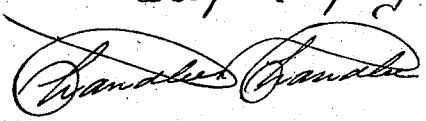

UNITED STATES PATENT OFFICE.

JOSEPH RAMSPERGER, OF YORK, PENNSYLVANIA.

ARTIFICIAL TOOTH.

No. 854,842.  Specification of Letters Patent.  Patented May 28, 1907.

Application filed November 8, 1906. Serial No. 342,520.

*To all whom it may concern:*

Be it known that I, JOSEPH RAMSPERGER, a citizen of the United States, residing at York, in the county of York, State of Pennsylvania, have invented certain new and useful Improvements in Artificial Teeth; and I do hereby declare the following to be a full, clear, and exact description of the invention, such as will enable others skilled in the art to which it appertains to make and use the same.

This invention relates to improvements in artificial teeth and particularly to improvements in the means for securing the dowel pins in the teeth.

It has been found in practice that a dowel pin cannot be made to stay in an ordinary straight hole for the reason that the friction is not sufficient and if the fit is made sufficiently close to insure against the pin pulling out, then there is danger of cracking the tooth in forcing the pin into place. Various methods have been proposed for securing the pins by soldering them to plates baked into the teeth, but such plates must be of platinum because of the necessity of refractoriness and prevention of discoloration of the teeth. Platinum plates are expensive and in a factory where millions of teeth are manufactured in a year, the aggregate expense is enormous. It has been found that the best method for holding the pins in the teeth is to enlarge the inner end of the holes or recesses that receive the pins and then provide the pins with heads that fill the enlargements. It is desirable that the heads of the pins be of solder because of the cheapness of the material and of the operation. It is found in practice, however, that a simple inwardly enlarged cavity in a porcelain tooth cannot be filled with solder as a head for a pin for the reason that the solder when melted, instead of flowing into close contact with the wall of the enlargement, clings to the pin and follows along it outwardly of the recess. It has been proposed to line the recess and its enlargement with an inwardly expanded platinum tube, but both the material and the process are expensive. Such a lining has for its object to provide a metal surface to which the solder will cling so that the enlargement may be filled with solder.

The object of the present invention is to provide a tooth wherein the enlarged portion of an inwardly enlarged pin-receiving recess in the tooth will be provided with a thin metal lining having an exterior diameter greater than the diameter of the unlined portion of the recess, to which lining the melted solder will flow and cling and by which it will be held within the enlargement of the cavity to completely fill the cavity while uniting with the pin to form a head for the pin so that the pin will not depend upon the metal lining for being held in the tooth, but will be held securely by its solder head.

In the drawings—Figure 1 is a longitudinal section through a tooth ready for baking with the core-pin having its combustible head in place and surrounded by a shor tube or ribbon of platinum or other refractory metal. Fig. 2 is a transverse section through the tooth showing the two core-pins and accompanying parts. Fig. 3 is a longitudinal section through the tooth with the lining in place and ready for the pin. Fig. 4 is a view similar to Fig. 3 showing the complete tooth with the pin in place.

The article can probably best be explained or described by detailing the method of forming it.

Referring now to the drawings, 1 designates a common form of mold for forming a false tooth. From one member of the mold there project two core-pins 3, the free end of each of which pins is slightly reduced in diameter as shown at 4 to receive a head 5. The head may be made of wood or paper or other combustible material and has a diameter slightly greater than the major diameter of the pin. In the present process, the periphery of the head is provided with an encircling tube or band 6 of platinum or other refractory metal. After the core-pin has been thus equipped, the plastic material for the tooth proper is placed in the mold and after having the tooth "biscuited" it is removed from the mold. The heat incident to the subsequent baking burns out the combustible head of the core-pin so that the tooth is provided with a recess or recesses, as the case may be, each recess being inwardly enlarged or enlarged at its inner end, the enlarged portion being provided with a lining of metal. The metal is preferably platinum, although it may be of some other refractory metal. The combustible head of the core-pin being of greater diameter than the major portion of the pin, the inner end portion of the cavity is of greater diameter than the outer end portion notwithstanding its metal lining.

A tooth thus produced may have a pin or pins 7 soldered into its cavity or cavities in any desired manner such as by dropping a small particle of solder into each cavity, then placing the pin in the cavity to rest upon the solder and then subjecting the entire tooth with its pin and solder to sufficient heat to melt the solder and cause it to unite with the pin and fill up the enlarged portion of the cavity either uniting continuously or not with the metal lining of the enlarged portion of the cavity as shown at 12.

The advantages in this particular type of tooth are that the platinum is reduced to a very small quantity, first by reason of being only about one-half the length necessary when a tube is used that reaches from the bottom of the cavity to the face of the tooth, and secondly by reason of the fact that as the lining does not necessarily form an anchor, but merely a surface to which the solder will flow, it may be very thin and in fact be platinum foil. Furthermore in the completed tooth with its pin or pins, the platinum lining does not necessarily act as an anchor for the pin or pins but merely provides a lining for the enlargement of the cavity, which lining has an affinity for solder so that the solder 12 while uniting with the pins 7 to form a head, will flow to the lining and completely fill up the enlargement of the cavity and thus hold the pin securely through the medium of the head alone, if necessary.

What is claimed is:

1. As an article of manufacture, an artificial tooth having a pin-receiving cavity therein, the inner end portion of which is enlarged, and a sheet metal lining against the side wall only of the enlarged portion of the cavity, the remaining part of the cavity being unlined, and the internal diameter of said lining being greater than the diameter of the unlined portion of the cavity.

2. As an article of manufacture, an artificial tooth having a pin-receiving cavity therein, the inner end portion of which is enlarged, and a sheet metal lining against the side wall only of the enlarged portion of the cavity, the remaining part of the cavity being unlined, and the internal diameter of said lining being greater than the diameter of the unlined portion of the cavity, a pin inserted in the cavity and having a solder head united thereto and to said lining, and filling the enlarged portion of the cavity.

3. As an article of manufacture, an artificial tooth having a pin-receiving cavity therein, the inner end portion of which is enlarged, and a lining of metal foil against the side wall only of the enlarged portion of the cavity, the remaining part of the cavity being unlined, and the internal diameter of said lining being greater than the diameter of the unlined portion of the cavity.

4. As an article of manufacture, an artificial tooth having a pin-receiving cavity therein, the inner end portion of which is enlarged, and a lining of metal foil against the side wall only of the enlarged portion of the cavity, the remaining part of the cavity being unlined, and the internal diameter of said lining being greater than the diameter of the unlined portion of the cavity, a pin inserted in the cavity and having a solder head united thereto and to said lining, and filling the enlarged portion of the cavity.

In testimony whereof, I affix my signature, in presence of two witnesses.

JOSEPH RAMSPERGER.

Witnesses:
B. M. PENTZ,
A. J. BRENNEMAN.